United States Patent Office 3,372,436
Patented Mar. 12, 1968

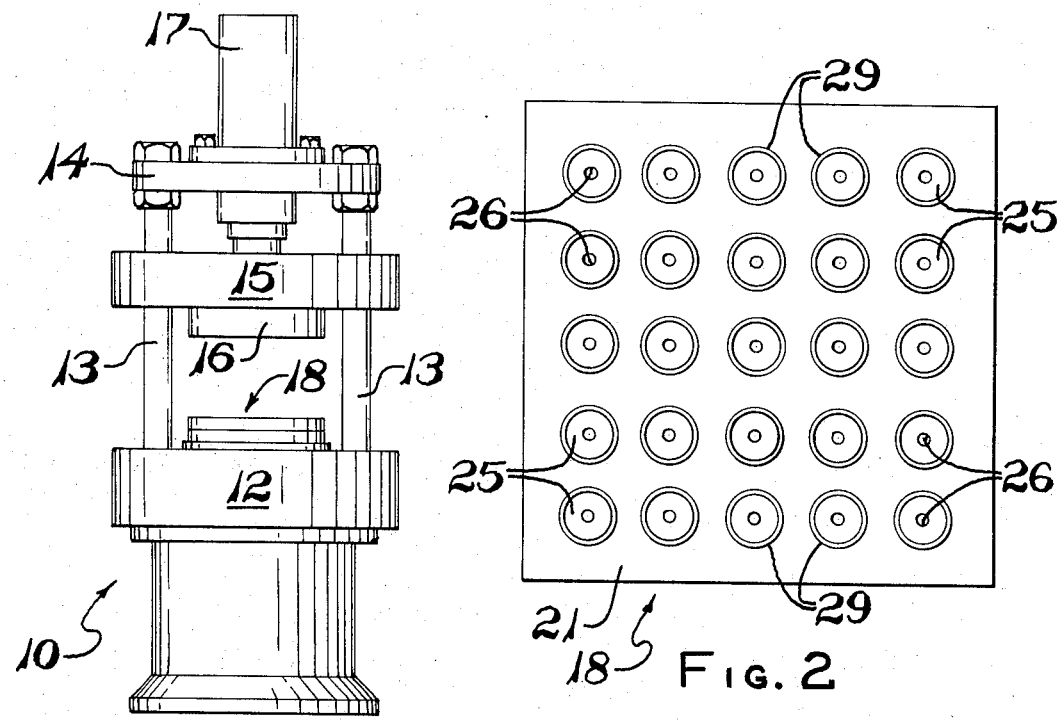
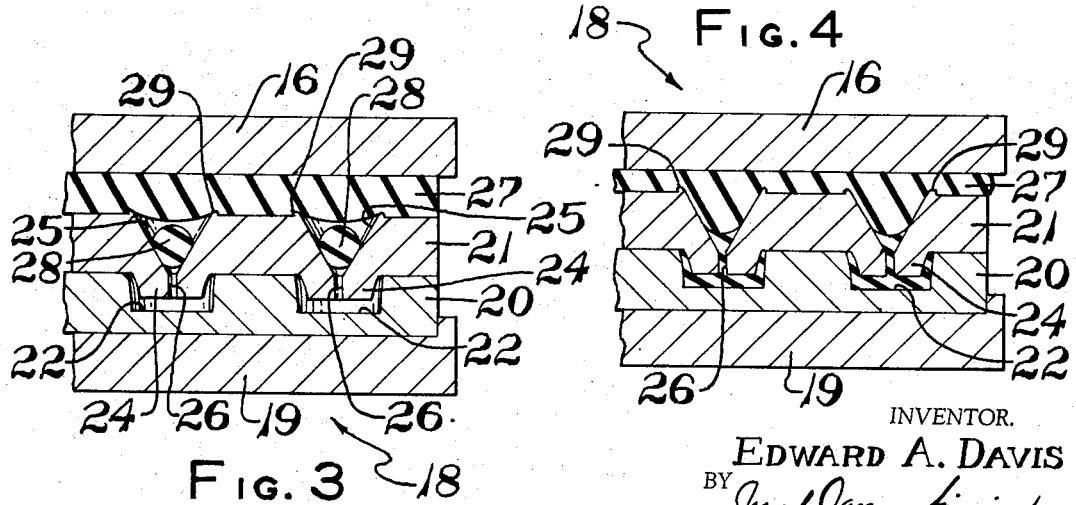

3,372,436
TRANSFER MOLDING APPARATUS
Edward A. Davis, Akron, Ohio, assignor to The B. F. Goodrich Company, New York, N.Y., a corporation of New York
Filed Apr. 12, 1966, Ser. No. 542,036
5 Claims. (Cl. 18—42)

This invention relates to a molding apparatus and more particularly to a novel apparatus for injection molding.

In the process of transfer molding as practiced in the art, the uncured stock is located beneath the surface of the pressure ram between the sprues and the ram. Sufficient pressure is then generated by the downward movement of the ram to cause the stock to flow through the sprues into the cavities to form the desired object. Such pressure generated by the ram seals the cavities from excess rubber flow which would cause flash formation. However, an undesirable feature of such process was an exceptionally high ratio of cured scrap which resulted in the volume of stock necessary to be located above the sprues to assure sufficient flow of material. Ordinarily such scrap cured stock would form a pad between the ram and the die portion filling completely the sprues which is the cured scrap material.

The present invention contemplates a novel apparatus which eliminates the high ratio of cured scrap necessitated by the previously described method and apparatus by utilizing a pressure pad located between the ram and the die and enlarging the upper portions of the sprue openings as by making the sprues' conical openings to accommodate biscuits of moldable material which material is forced by the transfer molding process through the lower portion of the sprues into the cavity mold.

It is an object of this invention to provide a new and improved apparatus for use in injection or transfer molding which eliminates the high ratio of uncured stock to the finished product.

Still a further object of this invention is the provision of a new arrangement for injection molding or similar compounds and which may easily be applied to conventional compression or injection presses without expensive modification thereof.

It is a further object of this invention to provide a novel cooperation between a movable ram and stationary die that minimizes waste in the cured stock.

A further object of this invention is to provide an economical transfer molding apparatus which has a small ratio of scrap cured stock to finished product.

Another object of this invention is to provide a novel method of transfer molding.

These and other objects achieved by this invention will become apparent as this invention proceeds with the accompanying drawings:

FIG. 1 is a simple diagrammatic view of a molding press;

FIG. 2 is a plan view of a multiple cavity die plate;

FIG. 3 is a fragmentary cross sectional view of the die plate, pressure pad and ram showing the relationship of the biscuits of moldable material prior to the molding operation; and FIG. 4 is a cross sectional view similar to that of FIG. 3 in which the ram compresses the pressure pad causing a flow of the moldable material into the mold cavity.

Referring now to the drawings, FIG. 1 discloses a molding press 10 of simple construction provided with a stationary lower platen 12 provided with a plurality of upright guide rods 13 which carry a cross head 14 fastened thereto by suitable means. Slidably mounted on the guide rods 13 is an upper platen 15 with a ram 16 which is movable toward and away from the lower platen 12 by means of a conventional hydraulic cylinder 17 rigidly connected to the cross head 14. Upper pressure platen 15 and lower platen 12 are provided with a plurality of steam channels for heating the molding apparatus and mold during the operation of the press. Suitably mounted on the lower platen 12 is a mold 18 illustrated as being of a three-part construction and comprises a bottom plate or section 19, a cavity plate or section 20, and a sprue plate or section 21. The cavity plate 20 is provided with a plurality of cavities 22 which cooperate with the projections 24 on the sprue plate 21 to define a mold cavity of the desired configuration of the finished product. It will be understood that the shape of the mold cavity will depend on the shape and construction of the article being molded. The mold shown is used to mold piston cups. The sprue plate 21 has a plurality of downwardly extending conical cavities 25 which connect via sprues 26 with the respective cavities 22. The juncture between the lower-most end portion of the sprues 26 and the respective cavities 22 is such that upon separation of the sprue plate 21 from the cavity plate 20 by any of the conventional automated practices upon completion of the operation removes the cured scrap rubber or moldable material upwardly away from the finished article leaving the completed article in a finished flashless condition. The mating surfaces between the sprue plate 21 and the cavity plate 20 are such that minute grooves therebetween permit pressurized gases to escape therethrough facilitating the flow of moldable material through the sprues 26 into the cavities 22 to fill such cavities and mold a finished product to exact dimensions without flash. As shown in FIG. 3, a pressure heat-resistant deformable pad 27 located between the sprue plate 21 and the ram 16 facilitates the molding of the finished product in a manner to be described.

In the operation of the apparatus, the assembled mold 18 is placed on the lower platen 12 and the biscuits of moldable material 28 are placed as by a jig or some other suitable means into the respective conical cavities 25. Thereafter, the pressure pad 27 molded from heat-resistant rubber is placed on the sprue plate 21 covering the sprue openings. The hydraulic press is now operated through hydraulic cylinder 17 to lower the ram 16 downwardly forcing the ram 16 into contact with the pressure pad 27 which pressure deforms the pad to compress the biscuits 28 of moldable material to cause the flow of such material. The biscuits of moldable material flow downwardly through the respective sprues 26 into engagement with the walls of the opening of the cavity 22 and fill the cavities with portions thereof extending upwardly into the sprues as illustrated in FIG. 4. The press is left in its closed position until the moldable material is cured after which the ram 16 is retracted to its uppermost position as shown in FIG. 1 and the cavity plate 20 is separated from the sprue plate 21 by any suitable means such as having the sprue plate 21 suitably hinged at its rear-end portion and having suitable pneumatic cylinders connected to the forward-end portion of the sprue plate 21. The separation of the sprue plate from the cavity plate 20 exposes the finished product separated from the cured scrap moldable material. The finished products may be removed easily from the cavity plate 20 as by a tilting operation and the scrap stock in the respective sprues 26 may be cleaned out as by a blast of air, thereby conditioning the apparatus for the next cycle of operation. To facilitate the operation of the present invention each sprue 26 has a sealing ring 29 extending circumferentially around the surface portion which is in engagement with the pressure pad 27 during the molding operation, which action facilitates the flow of material into the respective cavity molds, thereby eliminating the great quantity of scrap moldable material as heretofore experienced.

It should be understood, of course, that the foregoing disclosure relates to only a preferred embodiment of the invention and that numerous modifications or alterations may be made therein without departing from the spirit and the scope of the invention as defined in the appended claims.

I claim:

1. A molding apparatus comprising a first and second section which are disposed one against the other, one of said sections having a plurality of cavities cooperative with the other of said sections to define a plurality of mold cavities, said other section having a plurality of downwardly extending tapered sprues communicating with said mold cavities for feeding moldable material into corresponding ones of said mold cavities, a ram located above said sections and movable downwardly toward and away from said sections, means operatively connected to said ram for moving said ram toward and away from said sections, and means located between said ram and said other section for engagement by said ram for distortion into said sprues effecting the flow of moldable material located in said sprues from said sprues into said mold cavities.

2. A molding apparatus as set forth in claim 1 wherein said last-mentioned means comprises a pressure heat-resistant deformable pad.

3. A molding apparatus as set forth in claim 2 wherein each of said sprues has an upper conical shaped portion for receiving biscuits of moldable material, and said deformable pad being movable into said conical shaped portions.

4. A molding apparatus as set forth in claim 3 wherein said sections have abutting engaging surfaces defining minute grooves operative to permit the escape of compressed gases from said mold cavities but operative to confine the flow of moldable materials to said mold cavities.

5. A molding apparatus comprising separable first and second sections that are disposed one against the other, one of said sections having a plurality of recesses cooperative with projections on the other of said sections to define a plurality of molds, said other section having a plurality of conical cavities communicating through sprues to said molds for feeding moldable material into corresponding ones of said molds, a ram movable toward and away from said sections, a pressure heat-resistant deformable pad located between said ram and said other section for deformation into said conical cavities upon pressure exerted by said ram to cause the flow of moldable material located in said conical cavities from said conical cavities through said sprues into said molds, each conical cavity having an annular sealing ring located on the upper surface of said other section for engagement by said pressure heat-resistant pad to facilitate sealing of said sprues, and the mating surfaces of said sections having minute grooves to facilitate the escape of pressurized gases from said molds during flow of moldable material into said molds from said sprues.

References Cited

UNITED STATES PATENTS

| 2,190,659 | 2/1940 | Guerin. | |
|---|---|---|---|
| 2,883,704 | 4/1959 | Jurgeleit | 18—42 |
| 2,962,761 | 12/1960 | Hobson | 18—42 |
| 2,900,663 | 8/1959 | Linhorst | 18—42 |
| 3,145,423 | 8/1964 | Horvereid | 18—42 |
| 3,151,360 | 10/1964 | Jurgeleit | 18—42 |

J. HOWARD FLINT, JR., *Primary Examiner.*